(12) United States Patent
Mayala et al.

(10) Patent No.: US 8,935,344 B2
(45) Date of Patent: Jan. 13, 2015

(54) SYSTEMS AND METHODS FOR MESSAGE PERSONALIZATION

(75) Inventors: Tulsi Ram Mayala, Newark, CA (US); Shriram Vishwanathan, Pune (IN)

(73) Assignee: Strongview Systems, Inc., Redwood City, CA (US)

( * ) Notice: Subject to any disclaimer, the term of this patent is extended or adjusted under 35 U.S.C. 154(b) by 450 days.

(21) Appl. No.: 13/451,458

(22) Filed: Apr. 19, 2012

(65) Prior Publication Data

US 2013/0282837 A1 Oct. 24, 2013

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

2013/0046781 A1* 2/2013 Frankel et al. ................ 707/769

* cited by examiner

*Primary Examiner* — Shirley Zhang
(74) *Attorney, Agent, or Firm* — Morgan, Lewis & Bockius LLP; Brett A. Lovejoy

(57) ABSTRACT

Systems and methods for building personalized messages to one or more recipients. In one aspect, one or more personalized messages are created from one or more templates and one or more token lists. The templates include global tokens and local tokens. The token lists contain fields in the templates and corresponding token values. For each respective target recipient, a personalized message is generated by identifying and storing global tokens and corresponding global token values in a global cache, and identifying and storing local tokens and corresponding local token values in a local cache. The personalized messages are then created using the templates and substituting tokens with token values stored in the global and local cache. The personalized messages are then distributed to the corresponding target recipients.

21 Claims, 5 Drawing Sheets

SYSTEMS AND METHODS FOR MESSAGE PERSONALIZATION

1. FIELD OF THE INVENTION

Systems and methods for efficient message personalization are provided. More particularly, computer systems and methods for efficient processing and sending of personalized interactive digital messages are provided.

2. BACKGROUND OF THE INVENTION

Electronic mail (e-mail) is an essential network service. Most e-mail systems that send mail over the Internet use simple mail transfer protocol (SMTP) to send messages from one server to another. The messages can then be retrieved with an e-mail client using services such as post office protocol (POP) or Internet message access protocol (IMAP). Other protocols for sending e-mail include POP3, X.400 International Telecommunication Union standard (X.400), and the Novell message handling service (MHS), and extended simple mail transfer protocol (ESMTP). Specifically, X.400 defines a transfer protocol for sending electronic mail between mail servers and is used in Europe as an alternative to SMTP. MHS, which was developed by Novell, is used for electronic mail on Netware networks.

SMTP transports electronic mail among different hosts within the transmission control protocol/Internet protocol (TCP/IP) suite. Under SMTP, a client SMTP process opens a TCP connection to a server SMTP process on a remote host and attempts to send mail across the connection. The server SMTP listens for a TCP connection on a specific port (25), and the client SMTP process initiates a connection on that port. When the TCP connection is successful, the two processes execute a simple request-response dialogue, defined by the SMTP protocol (see RFC 821 STD 10, Simple mail transfer protocol, August 1982, for details), in which the client process transmits the mail addresses of the originator and the recipient(s) for a message. When the server process accepts these mail addresses, the client process transmits the e-mail instant message. The e-mail message contains a message header and message text ("body") formatted in accordance with RFC 822 (RFC822 STD 11, Standard for the format of ARPA-Internet Text Messages, August 1982). Mail that arrives via SMTP is forwarded to a remote server or it is delivered to mailboxes on the local server. On UNIX-based systems, Sendmail is the most widely used SMTP server for e-mail. Sendmail includes a POP3 server and also comes in a version for Windows NT. Microsoft Outlook is the most popular mail-agent program on Window-based systems.

The SMTP model (RFC 821) supports both end-to-end (no intermediate message transfer agents "MTAs") and store-and-forward mail delivery methods. The end-to-end method is used between organizations, and the store-and-forward method is chosen for operating within organizations that have TCP/IP and SMTP-based networks. A SMTP client will contact the destination host's SMTP server directly to deliver the mail. It will keep the mail item from being transmitted until it has been successfully copied to the recipient's SMTP. This is different from the store-and-forward principle that is common in many other electronic mailing systems, where the mail item may pass through a number of intermediate hosts in the same network on its way to the destination and where successful transmission from the sender only indicates that the mail item has reached the first intermediate hop. The RFC 821 standard defines a client-server protocol. The client SMTP is the one which initiates the session (that is, the sending SMTP) and the server is the one that responds (the receiving SMTP) to the session request. Because the client SMTP frequently acts as a server for a user-mailing program, however, it is often simpler to refer to the client as the sender-SMTP and to the server as the receiver-SMTP. An SMTP-based process can transfer electronic mail to another process on the same network or to another network via a relay or gateway process accessible to both networks. An e-mail message may pass through a number of intermediate relay or gateway hosts on its path from a sender to a recipient.

A simple model of the components of the SMTP system is shown in FIG. 1. Users deal with a user agent (UA). Popular user agents for UNIX include Berkeley Mail, Elm, MH, Pine, and Mutt. The user agents for Windows include Microsoft Outlook/Outlook Express and Netscape/Mozilla Communicator. The exchange of e-mail using TCP is performed by an MTA. The most common MTA for UNIX systems is Sendmail, and a conventional MTA for Windows is Microsoft Exchange 2000/2003. Users normally do not deal with the MTA. It is the responsibility of the system administrator to set up the local MTA. Users often have a choice, however, for their user agent. The local MTA maintains a mail queue so that it can schedule repeat delivery attempts in case a remote server is unable. Also the local MTA delivers mail to mailboxes, and the information can be downloaded by the UA (see FIG. 1). The RFC 821 standard specifies the SMTP protocol, which is a mechanism of communication between two MTAs across a single TCP connection. The RFC 822 standard specifies the format of the electronic mail message that is transmitted using the SMTP protocol (RFC 821) between the two MTAs. As a result of a user mail request, the sender-SMTP establishes a two-way connection with a receiver-SMTP. The receiver-SMTP can be either the ultimate destination or an intermediate one (known as a mail gateway). The sender-SMTP will generate commands, which are replied to by the receiver-SMTP (see FIG. 1).

Both the SMTP client and server have two basic components: UA and local MTA. There are few cases of sending electronic-mail messages across networks. In the first case of communication between the sender and the receiver across the network (see FIG. 1), the sender's UA prepares the message, creates the envelope, and puts message in the envelope. The MTA transfers the mail across the network to the TCP-port 25 of the receiver's MTA. In the second case of communication between the sending host (client) and the receiving host (server), relaying could be involved (see FIG. 2). In addition to one MTA at the sender site and one at the receiving site, other MTAs, acting as client or server, can relay the electronic mail across the network. This third scenario of communication between the sender and the receiver can be accomplished through the use of an e-mail gateway, which is a relay MTA that can receive electronic mail prepared by a protocol other than SMTP and transform it to the SMTP format before sending it. The e-mail gateway can also receive electronic mail in the SMTP format, change it to another format, and then send it to the MTA of the client that does not use the TCP/IP protocol suite. In various implementations, there is the capability to exchange mail between the TCP/IP SMTP mailing system and the locally used mailing systems. These applications are called mail gateways or mail bridges. Sending mail through a mail gateway may alter the end-to-end delivery specification, because SMTP will only guarantee delivery to the mail-gateway host, not to the real destination host, which is located beyond the TCP/IP network. When a mail gateway is used, the SMTP end-to-end transmission is host-to-gateway, gateway-to-host or gateway-to-gateway; the behavior beyond the gateway is not defined by SMTP.

E-mail across SMTP, or the other protocols referenced above, is used extensively today to communicate relevant personalized information. For example, a company needs to frequently communicate to each of its numerous consumers with relevant personalized e-mail. In such a situation, companies often maintain information specific to each of its customers or clients in a data repository, such as customer databases, data files, customer relationship management (CRM) systems, and the like. One approach for communicating with all of these customers is to send personalized individual, batch, or bulk e-mail through an e-mail distributor or high-throughput mail transfer agent (MTA) system.

A mail transfer agent or MTA (also called a mail server, or a mail exchange server in the context of the Domain Name System) is a computer program or software agent that transfers electronic mail messages from one computer to another. Webster's New World *Computer Dictionary*, tenth edition, Wiley Publishing Inc., Indianapolis, Ind., defines an MTA as an e-mail program that sends e-mail messages to another message transfer agent. An MTA can handle large amounts of mail, can interact with databases in many formats, and has extensive knowledge of the many SMTP variants in use. Examples of high-throughput MTA systems are disclosed in U.S. patent application Ser. No. 10/857,601, entitled "Email Delivery System Using Metadata," filed May 27, 2004 as well as U.S. patent application Ser. No. 10/777,336, entitled "Email Using Queues in Non-persistent memory," filed Feb. 11, 2004, each of which is hereby incorporated by reference in its entirety. One example of an MTA system is the Strong-Mail MTA (Redwood Shores, Calif.). Conventional MTA programs include, but are not limited to, sendmail, qmail, Exim, and Postfix.

High-throughput MTA systems such as those described above are more powerful than conventional MTA programs. Both high-throughput and conventional MTA products can send out messages to a plurality of recipients. However, while functional, existing MTA systems are unsatisfactory. To illustrate why, consider the case in which company A wishes to communicate with existing or past customers. The company maintains a record of each of these customers in a company database. Such records may contain personalized information about each of the customers. Company A wishes to use this information in order to customize each of the e-mails. To accomplish this, a method for accessing the customer information in the database needs to be arranged. Separately, the design of the e-mail that will be sent to each customer in the distribution list needs to be created. Therefore, at a minimum, what is needed is coordination between an information technology (IT) specialist and a business development professional in order to configure data from one or more sources to create messages to be delivered using the MTA distribution.

An IT specialist is consulted in order to provide a secure method for querying the database containing customer information. For instance, the IT specialist might set up an account with limited database privileges as well as construct scripts with customized database queries in order to obtain the information for each customer. At a minimum, such information will include an e-mail address for each customer. In more powerful examples, the names of the customers are identified, as well as other information such as the types of products the customer has bought in the past, geographic information, information about the customer payment history, how often the customer buys products, how much product the customer buys, and so forth. Thus, it is clear that an IT specialist is needed in conventional MTA based distribution efforts each time a business development professional designs a new e-mail for distribution using an MTA. The role of the business development professional is to optimize the persuasiveness and effectiveness of the customized MTA distribution. The work of the business development professional involves choosing fonts, color schemes and art that will be used in the customized e-mail sent to a plurality of recipients. The work of the business development professional further involves making decisions about which customers will receive a customized e-mail. The business development professional can, for example, select customers as a function of geographic region, amount of product bought from the company during a predetermined time period, etc. Thus, close coordination between the business development professional and the IT specialist is needed for each business development project that involves the distribution of customized electronic messages using an MTA.

The business development example provided above is just one example of the many applications that can be implemented using e-mail. Other applications include providing secure custom statements (e.g., banking statements), person-to-person customized e-mail, traceable e-mails, e-mails from customer service to existing customers, e-mails from an employer to an employee, etc. However, conventional user agents do not provide satisfactory methods for supporting such features. As the example above shows, complex steps are necessary in order to support such applications. Accordingly, given the above background, what are needed in the art are improved systems and methods for generating and sending personalized e-mail messages for distribution.

Discussion or citation of a reference herein will not be construed as an admission that such reference is prior art to the present disclosure.

3. SUMMARY OF THE INVENTION

The present disclosure addresses many of the shortcomings and drawbacks found in the prior art. In the present disclosure, systems and methods are provided for building personalized messages to one or more recipients. In one aspect, one or more personalized messages are created from a mailing comprising one or more templates and one or more token lists. The templates include global tokens and local tokens. The token lists contain the tokens in the templates and corresponding token values. For each respective target recipient, a personalized message is generated by identifying and storing global tokens and corresponding global token values in a global cache, and identifying and storing local tokens and corresponding local token values in a local cache. The personalized messages are then created using the templates and substituting tokens with token values stored in the global and local cache. The personalized messages are then distributed to the corresponding target recipients.

In one aspect of the present disclosure, a computing device is provided for building a plurality of personalized messages from a mailing without human intervention. The mailing uses one or more templates and one or more token lists. Each template comprises a set of global tokens, and each template comprises a set of local tokens. The computing device comprises a processor and a memory. The memory stores a global cache and a local cache and, for each respective target recipient in a plurality of target recipients, the memory comprises instructions for execution by a processor. The instructions include: (a) identifying, in a template designated for the respective target recipient in the one or more templates, one or more global tokens not found in the global cache; (b) obtaining, for each global token in the one or more global tokens identified in (a), a corresponding global token value from the one or more token lists, each token list in the one or more token lists including one or more global tokens in the plurality of global tokens and corresponding global token values; (c) storing in the global cache, the one or more global tokens identified in (a) and their corresponding global token values obtained in (b); (d) storing in the local cache one or more local tokens in the template designated for the respective target recipient and corresponding local token values when the one or more local tokens are not present in the local cache; and (e) building a personalized message from the template designated for the respective target recipient by substituting global tokens in the template designated for the respective recipient with global token values stored in the global cache and substituting local tokens in the template designated for the respective recipient with local token values associated with the respective target recipient that are stored in the local cache, thereby building the plurality of personalized messages, wherein each personalized message in the plurality of personalized messages corresponds to a target recipient in a plurality of target recipients.

Yet in another aspect of the present disclosure, a computer system is disclosed for building a plurality of personalized messages from a mailing without human intervention. The mailing uses one or more templates and one or more token lists. Each template in the one or more templates comprises a set of global tokens, and each template in the one or more templates comprises a set of local tokens. The computer system comprises one or more processors and one or more memory, wherein, the one or more memory storing a global cache and a local cache, wherein, for each respective target recipient in the plurality of target recipients, the one or more memory comprise instructions, executable by the one or more processors, for: (a) identifying, in a template designated for the respective target recipient, one or more global tokens not found in the global cache; (b) obtaining, for each global token in the one or more global tokens identified in (a), a corresponding global token value from the one or more token lists, each token list in the one or more token lists including one or more global tokens in the plurality of global tokens and corresponding global token values; (c) storing in the global cache, the one or more global tokens identified in (a) and their corresponding global token values obtained in (b); (d) storing in the local cache one or more local tokens in the one or more templates and corresponding local token values when the one or more local tokens are not present in the local cache; and (e) building a personalized message from the template designated for the respective target recipient by substituting global tokens in the template designated for the respective target recipient with global token values stored in the global cache and substituting local tokens in the template designated for the respective target recipient with local token values associated with the respective target recipient that are stored in the local cache, thereby building the plurality of personalized messages, wherein each personalized message in the plurality of personalized messages corresponds to a target recipient in the plurality of target recipients.

Yet in another aspect of the present disclosure, a non-transitory computer readable medium comprising instructions to perform a method for building a plurality of personalized messages from a mailing without human intervention is disclosed. The mailing uses one or more templates and one or more token lists, wherein each template in the one or more templates comprises a subset of global tokens in a plurality of global tokens, and each template in the one or more templates comprises a subset of local tokens in a plurality of local tokens. The method is performed by one or more processors and one or more memory, the one or more memory storing a global cache and a local cache wherein, for each respective target recipient in the plurality of target recipients, the method comprises: (a) identifying, in a template designated for the respective target recipient in the one or more templates, one or more global tokens not found in a global cache; (b) obtaining, for each global token in the one or more global tokens identified in (a), a corresponding global token value from the one or more token lists, each token list in the one or more token lists including one or more global tokens in the plurality of global tokens and corresponding global token values; (c) storing in the global cache, the one or more global tokens identified in (a) and their corresponding global token values obtained in (b); (d) storing in the local cache one or more local tokens in the template designated for the target recipient and corresponding local token values when the one or more local tokens are not present in the local cache; and (e) building a personalized message from the one or more templates for the respective target recipient by substituting global tokens in the template designated for the target recipient with global token values stored in the global cache and substituting local tokens in the template designated for the target recipient with local token values associated with the respective target recipient that are stored in the local cache, thereby building the plurality of personalized messages, wherein each personalized message in the plurality of personalized messages corresponds to a target recipient in the plurality of target recipients.

In some embodiments, the present disclosure comprises flushing the local cache after building a first personalized message in a plurality of personalized messages and before building a second personalized message in the plurality of personalized messages. In some embodiments, the method occurs during load time. In some embodiments, the method further comprises sending each respective personalized message in a plurality of personalized messages to a corresponding target recipient. In some embodiments, the steps of the method are performed on a server. In some embodiments, the local token values stored in local cache are retrieved from a data repository of target recipient records and information. In some embodiments, the local token values stored in local cache are retrieved from a local token list received from a client computer. In some embodiments, the one or more templates are received from a client computer. In some embodiments, the one or more token lists in are received from a client computer. In some embodiments, global token values or local token values are themselves tokens or subtokens. In some embodiments, the personalized messages can be e-mail, SMS, FAX, IM, social network posts, voice, or any other digital communication process.

4. BRIEF DESCRIPTION OF THE DRAWINGS

Like reference numerals refer to corresponding parts throughout the several views of the drawings.

5. DETAILED DESCRIPTION

The present disclosure encompasses systems and methods for efficient message personalization for mailings. In a mailing, a client sends a set of template messages (templates), along with a set of token lists, to a processing module. The processing module then generates a customized or personalized message using data from a data repository or any other data source. The personalization process is optimized using a global cache and a local cache to store token definitions and values. Once the personalized message is generated, the personalized message is sent to corresponding target recipients using a standard email protocol. For a general reference regarding e-mail protocols, see Hughes, 1998, *Internet E-mail: Protocols, Standards, and Implementation*, Artech House Publishers, which is hereby incorporated herein by reference in its entirety.

Figure 3:
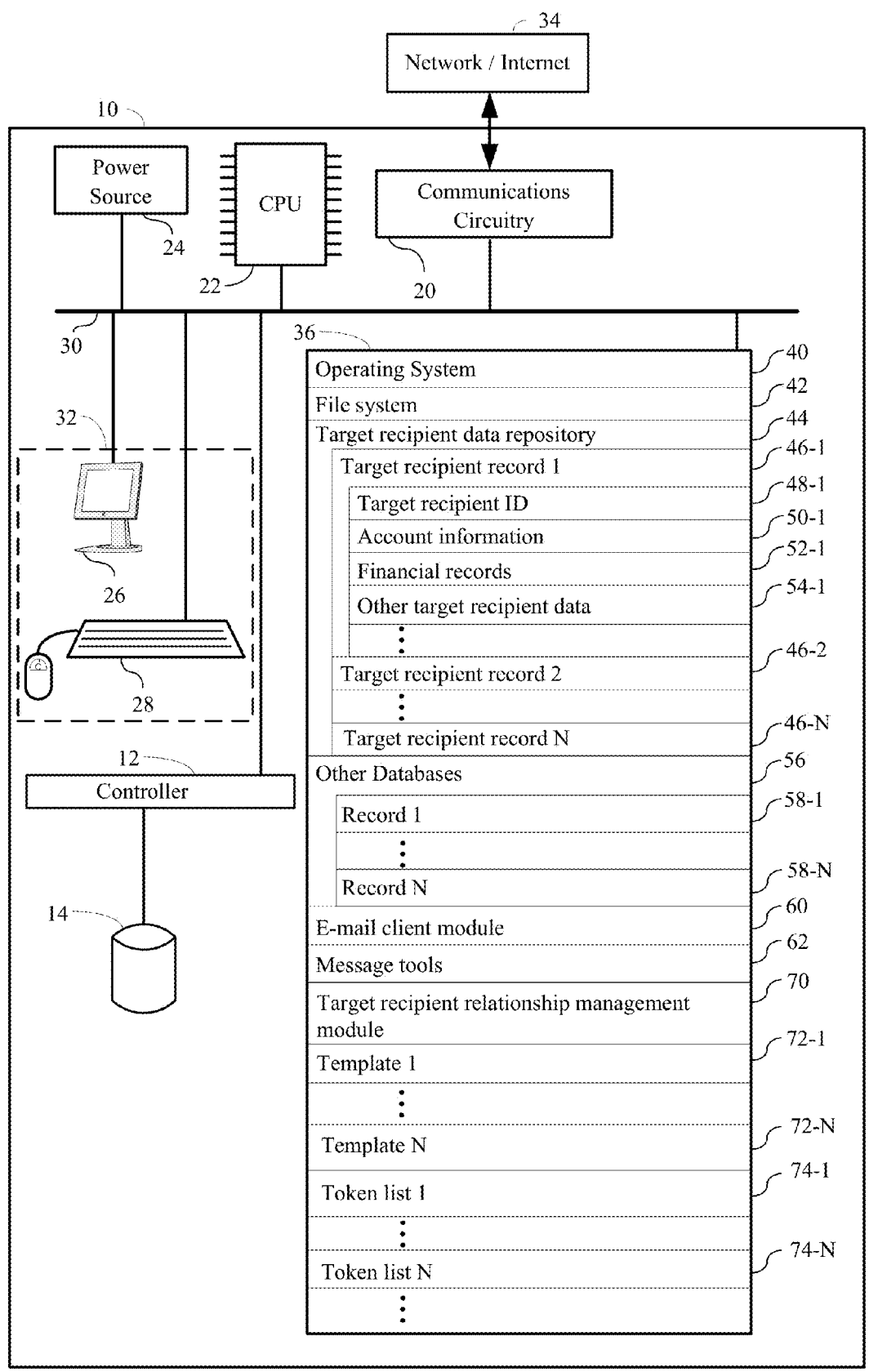
FIG. 3 is a schematic diagram of a client computer system for sending template messages and lists for a mailing in accordance with an embodiment of the present disclosure.

FIG. 3 details an exemplary system that supports the functionality described above. The system is preferably a computer system 10 having:
- a central processing unit 22;
- a main non-volatile storage unit 14, for example, a hard disk drive, for storing software and data, the storage unit 14 controlled by controller 12;
- a system memory 36, preferably high speed random-access memory (RAM), for storing system control programs, data, and application programs, comprising programs and data loaded from non-volatile storage unit 14; system memory 36 may also include read-only memory (ROM);
- a user interface 32, comprising one or more input devices (e.g., keyboard 28) and a display 26 or other output device;
- a network interface card 20 or other communication circuitry for connecting to any wired or wireless communication network 34 (e.g., the Internet or any other wide area network);
- an internal bus 30 for interconnecting the aforementioned elements of the system; and
- a power source 24 to power the aforementioned elements.

Operation of computer 10 is controlled primarily by operating system 40, which is executed by central processing unit 22. Operating system 40 can be stored in system memory 36. In addition to operating system 40, in a typical implementation, system memory 36 can include one or more of the following:
- file system 42 for controlling access to the various files and data structures used by the present disclosure;
- a target recipient data repository 44 including a plurality of target recipient records 46, each target recipient record 46 corresponding to a particular target recipient, for example, data related to target recipient name 48, account information 50, financial records 52, and other target recipient data 54;
- other data repositories, databases or data structures 56, including records 58 which may be resident in memory 36 or addressable by system 10 through a network connection, storage media interface, or the like;
- an e-mail client 60 for sending templates or token lists to a personalization module on a remote computer (server) using a data network and/or Internet;
- optional message tools 62 to aid in generating templates 72 or token lists 74;
- an optional target recipient relationship management module 70; and
- templates 72 and token lists 74 to be sent to server 202 for message personalization.

As illustrated in FIG. 3, computer 10 comprises software program modules and data structures. The data structures stored in computer 10 include, for example, target recipient data repository 44 and one or more other databases 56 (e.g., an enterprise resource planning database, a human resource database, a supply chain database, etc.). In some embodiments, target recipient data repository 44 is replaced and/or supplemented with other forms of customization data such a site-specific maps, weather, specific forms on news, market data, conference room availability, etc. In some embodiments, such customization data is in addition to target recipient data repository 44. Each of these data structures can comprise any form of data storage including, but not limited to, a flat ASCII or binary file, an Excel spreadsheet, a relational database (SQL), or an on-line analytical processing (OLAP) database (MDX and/or variants thereof). In some embodiments, target recipient data repository 44, optional databases 56, and target recipient relationship management module 70 are not housed on client 10, but rather are housed on a separate server and/or are located on computers that are in electronic communication with such a server.

In some embodiments, each of the aforementioned data structures that are stored on or are accessible to system 10 is a single data structure. In other embodiments, such data structures, in fact, comprise a plurality of data structures (e.g., databases, files, archives) that may or may not all be hosted by computer 10. For example, in some embodiments, repository 44 comprises a plurality of structured and/or unstructured data records that are stored either on computer 10 and/or on computers that are addressable by computer 10 across network/Internet 34.

In some embodiments, data repository 44 and/or database 56 comprises a database that is either stored on computer 10 or is distributed across one or more computers that are addressable by computer 10 by network/Internet 34. Thus, in some embodiments, one or more of such data structures is hosted by one or more remote computers (not shown). Such remote computers can be located in a remote location or in the same room or the same building as computer 10. As such, any arrangement of the data structures and software modules illustrated in FIG. 3 on one or more computers is within the scope of the disclosure so long as these data structures and software modules are addressable by computer 10 across network/Internet 34 or by other electronic means. Moreover, other systems, application modules and databases not shown in FIG. 3 can be stored in system memory 36. Thus, the present disclosure fully encompasses a broad array of computer systems.

In some embodiments, client computer 10 is used to store target recipient data 46, 56 or other forms of customization data, to create templates 72 and token lists 74 for target mailings, and to send the templates and the token lists to a personalization module on a remote computer. In some embodiments, templates 72 are skeletons for generating personalized messages containing text common to all generated personal messages per mailing and fields called tokens. Templates contain two types of tokens; global and local.

Global tokens are fields in the template that are non-target-specific. In other words, global tokens are fields that do not pertain to a particular target. For example, a global token "##Holiday##" may correspond to the value "Happy Holidays," which is non-target-specific because "Happy Holidays" can apply to multiple target recipients. By contrast, local tokens, also known as record level tokens, are fields that are specific to a particular target of a mailing. For example, the local token "##name##" may correspond to the value "Jeff," which is specific to the particular target recipient, Jeff. Thus, global tokens in general correspond to the same values for different target recipients, whereas local tokens correspond to different values for different target recipients.

Global tokens and their corresponding values are listed in token lists 74. Local tokens and their corresponding values are stored in target recipient data repository 44 and/or database 56 and/or CRM 70 and/or other sources of customization data (e.g., maps, weather). In addition, in some embodiments, local tokens are not stored in data repositories or databases, but rather on the same token list as global tokens or on a separate token list for local tokens. In some embodiments, a mailing contains data for a single digital message for a single recipient. In other embodiments, a mailing comprises data for a plurality of personalized messages each intended for a different recipient. In still other embodiments, a mailing comprises data for a plurality of personalized messages each intended for the same or different recipient. Such personalized messages can be distributed by e-mail, SMS, FAX, IM, voice, or any other digital communication process. However, in preferred embodiments, the personalized messages are e-mail messages.

In some embodiments, e-mail client module 60 is used to send the mailing. In some embodiments, the mailing is constructed using text editing functionality directly provided by client 60. In other embodiments, optional message tools 62 are provided to assist in the creation of the mailing. Such message tools can include, for example, a graphical user interface (GUI) driven XML and/or HTML editor for designing the appearance of customized e-mails for distribution. In such embodiments, message tools reducing the image produced using the GUI to a set of commands for inclusion in the mailing. Although SMTP is used to introduce and illustrate the concepts of the present disclosure, the scope of the disclosure is not limited to SMTP. For example, extended simple mail transfer protocol (ESMTP) has been developed to meet the increasing demands of attaching various types of files to e-mails. ESMTP specifies additional extensions to the original protocol for sending e-mail that supports graphics, audio and video files, and text in various national languages. Other examples of mail protocols that can be used to send a mailing to a server include, but are not limited to, POP3, X.400, or MHS protocols or logical variants thereof (e.g., e-mail messages sent using programs similar to or derived from POP3, X.400, or MHS).

In some embodiments the mailing is compliant with one of the aforementioned e-mail protocols and is encoded in the XML language. XML is described in, for example, Ray, *Learning XML*, second edition, O'Reilly Associates; Harold and Means, *XML in a Nutshell*, third edition, O'Reilly Associates; and Hunter et al., *Beginning XML*, third edition, Wrox, each of which is hereby incorporated herein by reference in its entirety.

Figure 4:
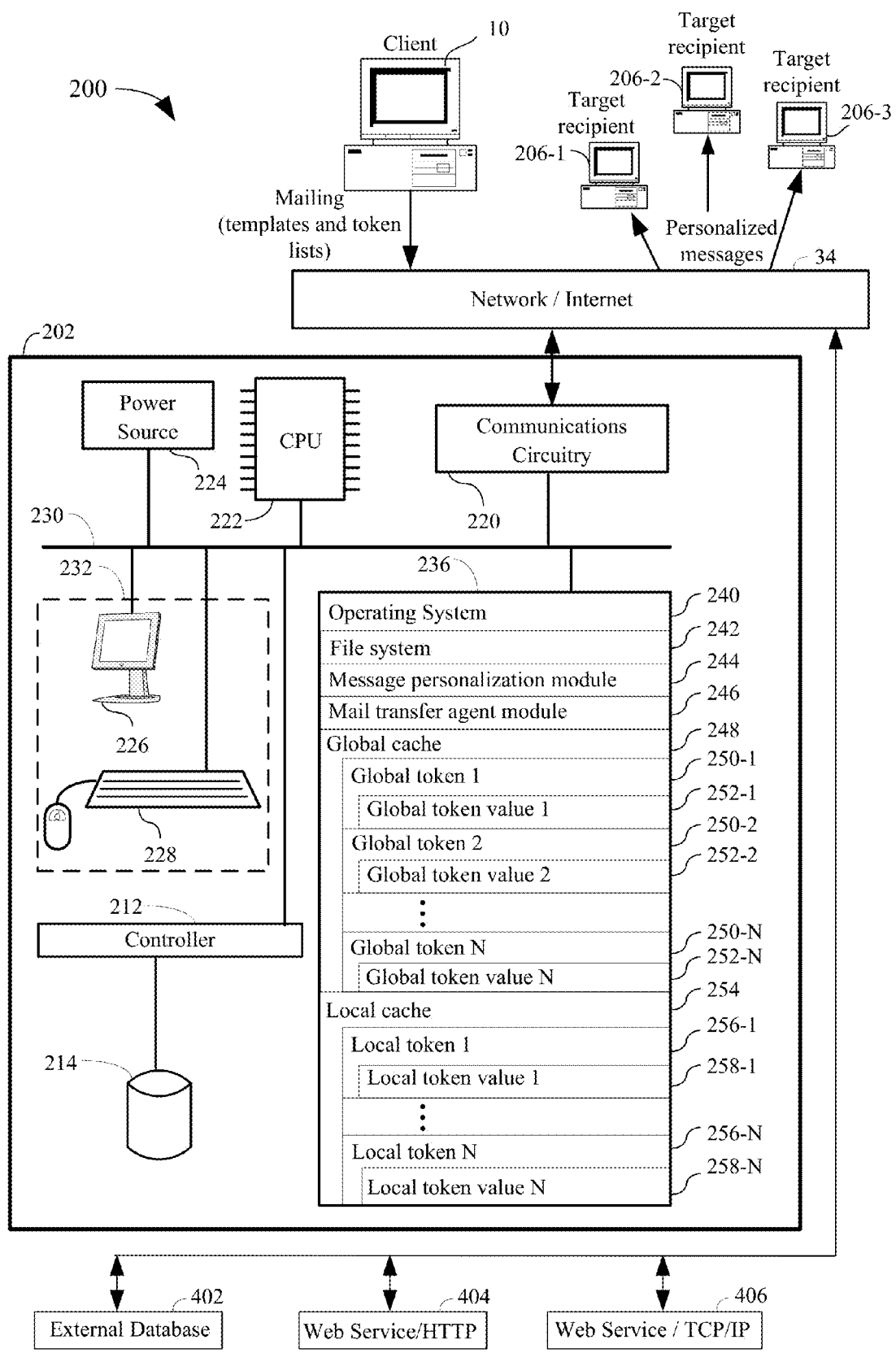
FIG. 4 is a schematic diagram of a system according to the present disclosure for generating personalized messages for a mailing.
Figure 5:
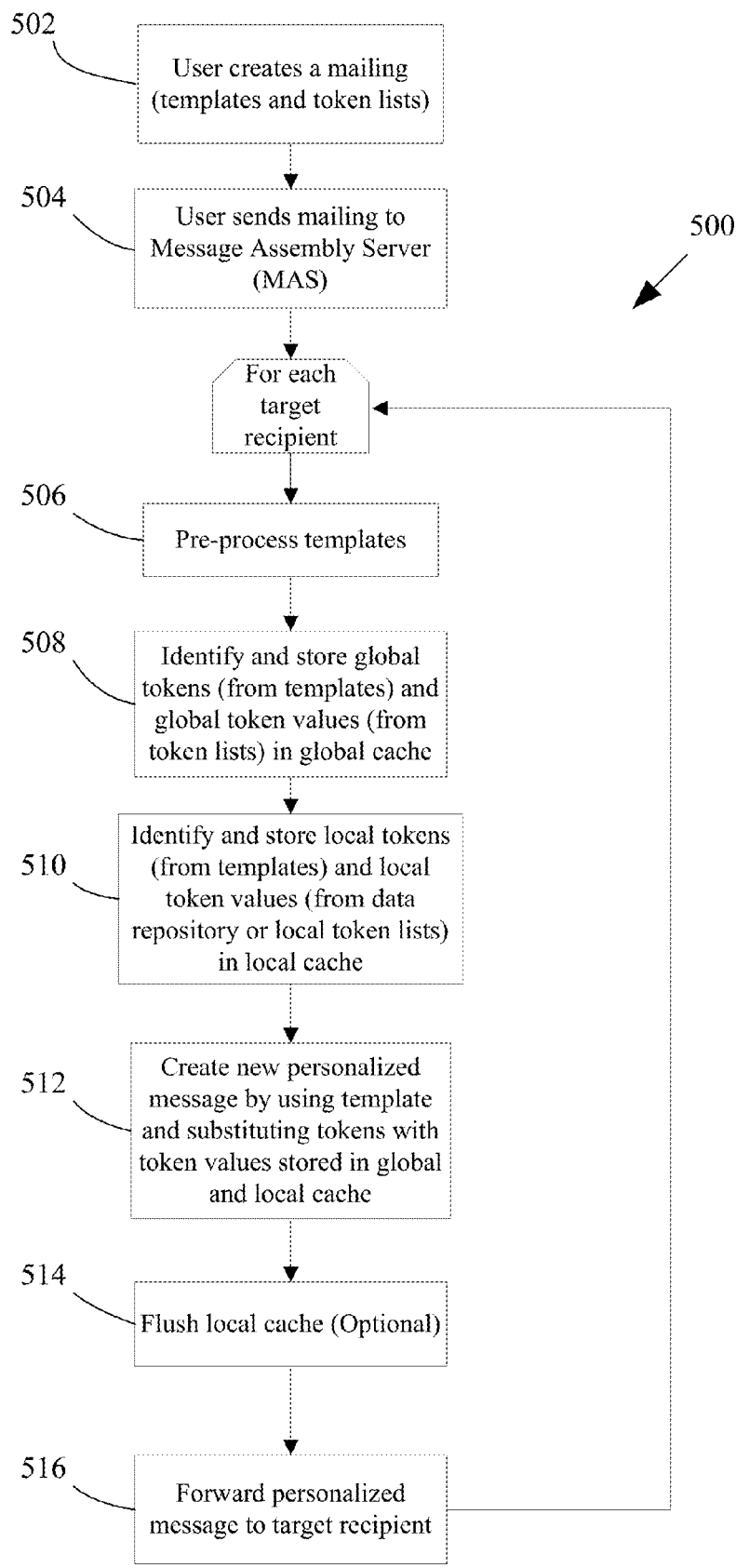
FIG. 5 is a flowchart depicting a method of creating and sending personalized messages to one or more intended recipients using templates and token lists in accordance with an embodiment of the present disclosure.

Now that an overview of a client system in accordance with one embodiment of the present disclosure has been described, various advantageous methods that can be used in accordance with the present disclosure will now be disclosed in conjunction with FIGS. 4 and 5.

FIG. 4 shows an embodiment of a system 200 in accordance with the present disclosure. Referring to FIG. 4, in an embodiment in accordance with the present disclosure, user computer 10 is used to generate a mailing comprising templates and token lists. User computer 10 further sends the mailing to message assembly server 202. In the embodiment illustrated in FIG. 4, server 202 includes conventional MTA functionalities in addition to the functionalities of the present disclosure. In other embodiments, server 202 includes functionality for distributing other forms of digital communication such as SMS, FAX, IM, or voice mail. The server 202 illustrated in FIG. 4 comprises:

a CPU 222;
a main non-volatile storage unit 214 controlled by controller 212;
a system memory 236, preferably high speed random-access memory (RAM), for storing system control programs such as operating system 240 and file system 242, data and application programs loaded from non-volatile storage unit 214; system memory 236 may also include read-only memory (ROM);
an optional user interface 232, comprising one or more input devices (e.g., keyboard 228) and a display 226 or other output device;
a network interface card 220 or other communication circuitry for connecting to any wired or wireless communication network and/or Internet 34;
an internal bus 230 for interconnecting the aforementioned elements of the system; and
a power source 224 to power the aforementioned elements.

In some embodiments system memory 236 further comprises:

a message personalization module 244 for processing a mailing from a client 10 and creating personalized messages specific to each of a plurality of target recipients;
a mail transfer agent module 246 for sending personalized messages to target recipients;
a global cache 248 that stores global tokens 250 and corresponding global token values 252, and
a local cache 254 that stores local tokens 256 and corresponding local token values 258.

In some embodiments, information stored in both global cache 248 and local cache 252 is in efficient structured form. In some embodiments, objects in cache contain memory references to tokens pending for complete personalization. In some embodiments, objects in cache know where values of tokens need to be replaced.

Mailings of the present disclosure can be sent, for example, by e-mail from client 10 to message assembly server 202 when a user desires to have server 202 generate and send one or more personalized messages, such as personalized e-mails, to one or more intended target recipients 206, e.g., clients, customers, potential customers, and/or any other desired target recipients for whom the user has access to personalized data in a data repository 204.

In some embodiments, message personalization module 244 processes the mailing from client 10 and creates personalized messages specific to each target recipient 206. Mail transfer agent module 246 then sends the personalized messages to target recipients 206.

In some embodiments in accordance with the present disclosure, server 202 is external with respect to client 10 (e.g., FIG. 4). In some embodiments in accordance with the present disclosure, the personalized messages are sent from server 202. Alternatively, in other embodiments in accordance with the present disclosure, server 202 is an integral part of recipient 206. In still other embodiments in accordance with the present disclosure, client 10 is an integral part of server 202.

FIG. 5 provides a general overview of a method 500 for sending personalized messages to intended recipients in accordance with an embodiment of the present disclosure. In step 502, a user creates a mailing at client 10. This mailing comprises one or more templates 72 and one or more token lists 74. In some embodiments, a template 72 is a skeleton message including general text to be included in all personalized messages and fields called tokens. The tokens and their values are listed in the token lists 74. Both templates 72 and token lists 74 can include text, markup language (e.g., HTML, WML, BHTML, RDF/XML, RSS, MathML, XHTML, SVG, cXML or XML), or other scripts or objects. In some embodiments, the mailing is created directly using e-mail client 60 module (FIG. 3). In some embodiments, the mailing is created using optional message tools 62 (FIG. 3). From here, the present disclosure provides different possibilities (use cases).

In the first use case, the user sends the mailing directly to message assembly server 202 as noted in step 504 of FIG. 5 using E-mail client module 60 (FIG. 3). The mailings can be specified using standard email protocols, UI Wizard, and Web Service APIs. The mailings can also be sent using standard content upload mechanisms, such as FTP and HTTP file upload. To illustrate this use case, consider a situation in which marketing manager John creates a single mailing in the form of an e-mail using computer 10 of FIG. 3 that contains a template using tokens and a list of tokens and their values. John sends the mailing using standard OUTLOOK/Exchange (an example of client module 60) to exml@XYZ.com, the electronic address of message personalization module 244. The message personalization module 244 interprets the mailing and data in the mailing and creates fully personalized messages, in the form of e-mail, to all the final recipients.

In the second use case, the user sends a mailing to target relationship management module (TRRM) 70 before the mailing is sent to message assembly server 202 in accordance with step 504 of FIG. 5. To illustrate this use case, consider the situation in which marketing manager Debbie decides to make use of TRRM system 70 of FIG. 3. The TRRM system already does some limited personalization. Debbie creates a new mailing template that contains more extensive personalization than the first use case (e.g., by using XML/XSLT). The mailing that Debbie wishes to make can be created in at least two different ways. In one approach, the mailing is created by message tools 62 (e.g., Outlook/Exchange) and sent to TRRM 70 where static TRRM tokens in the mailing are populated. Then, the mailing is sent from TRRM 70 of computer 10 to message personalization module 244 of computer 202. In another approach, the mailing is created directly in TRRM module 70. Regardless of how the mailing is originated, rather than sending the messages encoded by Debbie's mailing directly from TRRM 70 to one or more recipients, the personalized message is sent to a specific address, e.g., exml@XYZ.com, in this example, message personalization module 244.

Figure 1:
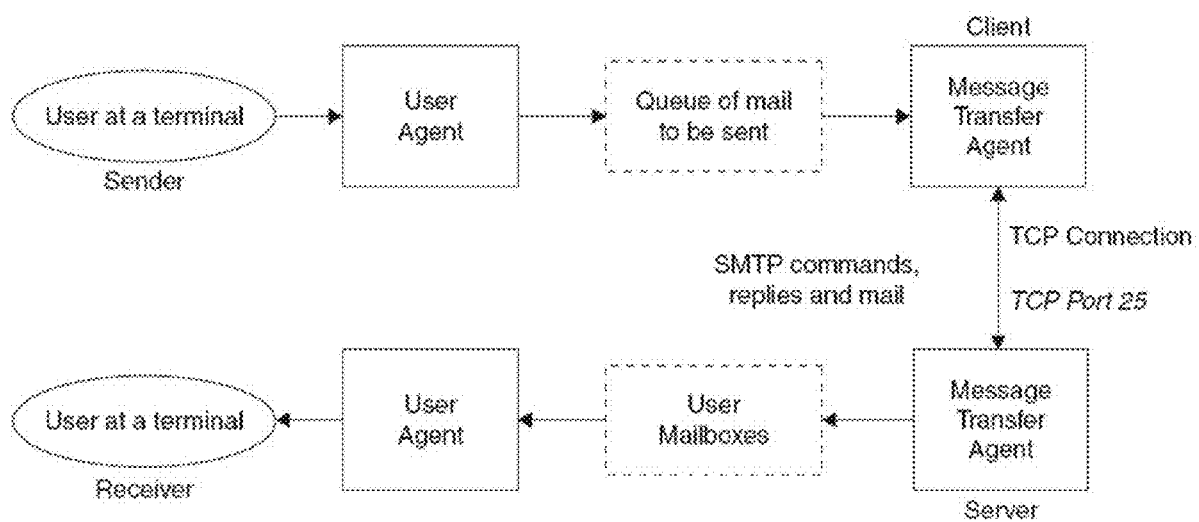
FIG. 1 is the basic simple mail transfer protocol (SMTP) model in accordance with the prior art.
Figure 2:
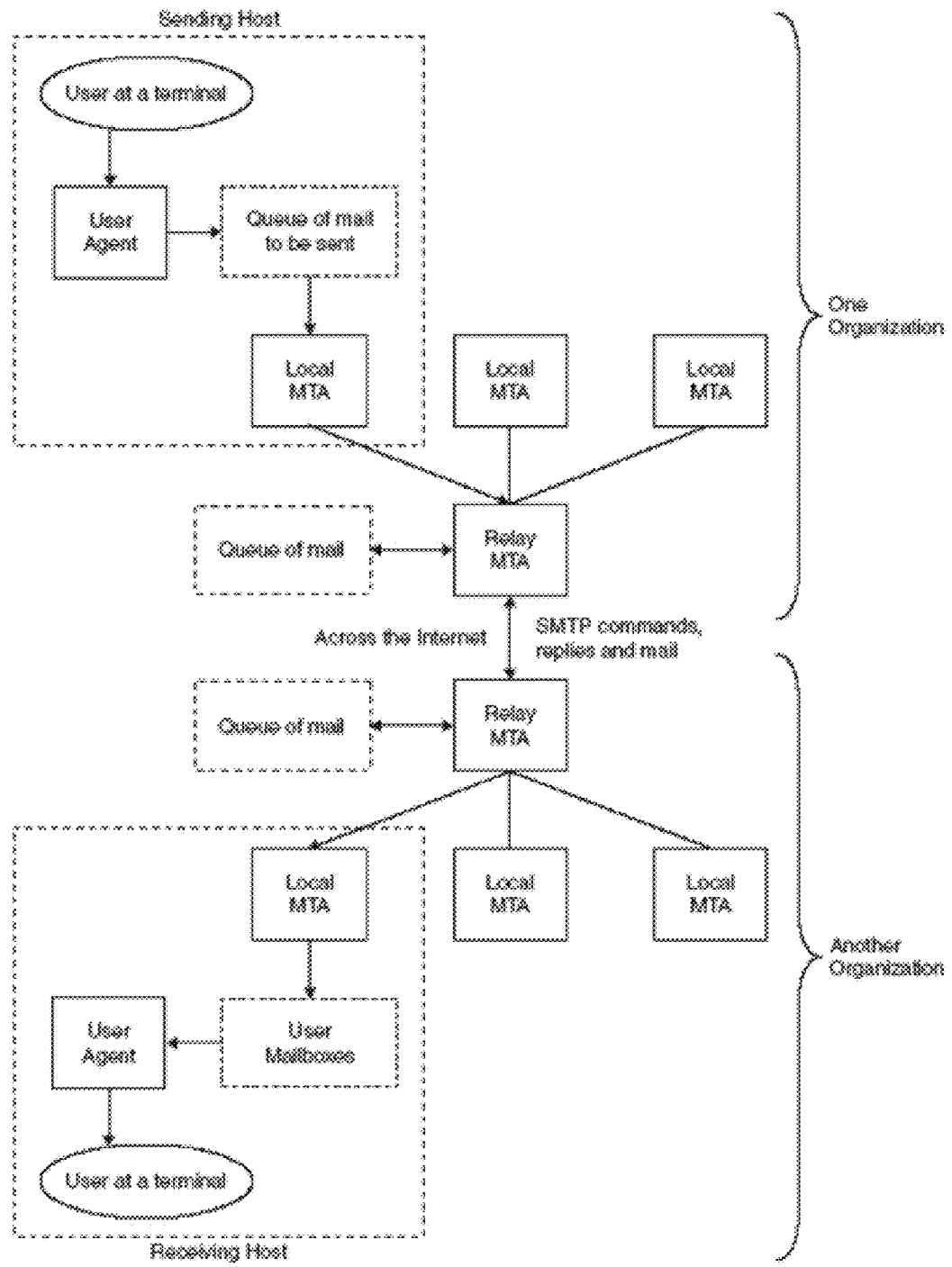
FIG. 2 is the simple mail transfer protocol (SMTP) model with relay mail transfer agents in accordance with the prior art.

In the third use case, the user sends the mailing directly to message assembly server 202 as noted in step 504 of FIG. 5 using e-mail client module 60 (FIG. 1). The mailing contains multiple levels of information from multiple templates 72 and multiple token lists 74. To illustrate this use case, consider a situation in which sales manager Mark creates multiple EXML templates 72 using computer 10 of FIG. 3 and multiple token lists 74. Mark then sends the mailing using standard Outlook/Exchange (an example of E-mail client 60) to exml@XYZ.com, the address of message personalization module 244. For each target recipient, a personalized message is created using some or all of the templates and token lists. Message personalization module 244 pre-processes the templates 72, substitutes the tokens with token values, and sends fully personalized messages (e.g. personalized e-mails) to one or more final recipients.

Referring to step 506, regardless of which use case is employed in preceding steps, message personalization module 244 on server 202 pre-processes the templates 72 sent by client 10 in order to create personalized messages. In one embodiment, message personalization module 244 creates a new message and copies text over from the templates 72. In another embodiment, message personalization module 244 simply merges and modifies the original templates 72.

Referring to step 508, message personalization module 244 identifies and stores global tokens 250 and corresponding global token values 252 in global cache 248. Global tokens 250 are tokens which can be resolved using the token lists 74. In this case, resolving a token means determining the value of the token and replacing the token with the determined token value. If the token is in token list 74, the value of the token is also in token list 74 and thus is known. For example, a token "##MailingID##" in a template 72 can be resolved by looking up "##MailingID##" in a token list 72-1. If "##MailingID##" can be found in token list 72-1, then the value of token "##MailingID##," can also be found in token list 72-1 and is thus known. Since the value of "##MailingID##" is known from token list 72-1, "##MailingID##" is a global token. Once identified, global tokens and their values are stored in global cache 248. In some embodiments, global cache 248 is a part of memory 236. In other embodiments, global cache 248 is separate from memory 236. Storing global tokens and their corresponding values in global cache 248 allows for quick access to the token values when personalizing the messages.

Referring to step 510, message personalization module 244 on server 202 also identifies and stores local tokens 256 and their corresponding values in local cache 254. Local tokens 256 are tokens that can be resolved only by retrieving record level information from target recipient data repository 44 or other databases 56. Record level information is any information pertaining to target recipients. For example, if token "##name##" can only be resolved by retrieving target recipient record 46-1 in target recipient data repository 44, then "##name##" is a local token and it and its corresponding value are stored in local cache 254. Like global cache 248, local cache 254 can be part of memory 236 or completely separate.

Referring to step 512, new personalized messages are created by substituting tokens in the template with token values found in either global 248 or local cache 254. In some embodiments steps 508 and 510 are processed concurrently or nearly concurrently and step 512 is processed subsequently. In other embodiments, all three steps occur concurrently or nearly concurrently. In still other embodiments, the steps can occur in succession with any order, as long as step 512 does not occur before steps 508 or 510 have been initiated.

After a new personalized message has been created, server 202 forwards the personalized message to the intended target recipient for which the record level data was retrieved from target recipient data repository 44. Server 202 can send the message through either message personalization module 244 or mail transfer agent 246. The delineation of a separate message personalization module 244 and mail transfer agent 246 as two separate modules is for illustrative purposes only. In some embodiments, message personalization module 244 and mail transfer agent module 246 are contained in the same software program. As such, the description of message personalization module 244 and mail transfer agent module as separate modules is merely provided herein to best illustrate the functionality of the MTAs of some embodiments of the present disclosure.

After sending the personalized message to the target recipient, server 202 repeats the process for a different target recipient until no more target recipients remain. In some embodiments, server 202 repeats the process after sending the personalized message in step 516. In other embodiments, server 202 repeats the process after creating the new personalized message in step 512 and then sends all the personalized messages to their respective target recipients at once. Still in other embodiments, server 202 sends the personalized messages when the process has repeated for a predefined number of cycles.

Referring to step 514, after a particular personalized message has been created, the local cache 254 is flushed. Flushing the local cache 254 frees up memory space to store local tokens and corresponding values for the personalized message that is to be sent to a different target recipient. In some embodiments, step 514 is optional. In other embodiments of the present disclosure, local cache 254 is not flushed, but rather new local token values 258 that are retrieved with respect to a different target recipient simply replace the old token values 258 for corresponding local tokens 256 that are already stored in local cache 254 from the previous cycle.

One advantage of the message personalization methods of the present disclosure is that there is no absolute requirement for a specialized user interface in order to create a mailing. For example, one can simply use an application such as Microsoft Outlook, and add lists from a spreadsheet, if desired. In fact, the mailing can be constructed in a simple ASCII editor. In some embodiments, if a user has data in a customer relationship management database (e.g., Siebel or Oracle), enhanced functionality such as tracking, dynamic content, and the like can be utilized and/or incorporated to generate and send personalized messages such as personalized e-mail messages.

In some embodiments, the systems and methods of the present disclosure provide a user with the ability to encode instructions in the mailing that instruct message personalization module 244 to access data from, or provide data to, data repositories stored in external systems (e.g., customer data repository 44 and/or other database 56 or flat file stored by or addressable by computer 202). In other embodiments, server 202 itself contains instructions for retrieval from such data repositories. Such data repositories can include, for example, one or more hierarchical databases, and/or one or more relational databases, and/or one or more other data structures or flat files. As illustrated in FIG. 4, data can be retrieved or submitted, for example, over network connection 34 or from storage media provided to the message personalization module 244. In FIG. 4, message personalization module 244 can communicate with one or more external databases 402, HTTP web services 404, or TCP/IP web services 406 using network connection 34. Using the systems and methods of the present disclosure, such resources can be accessed in order to provide secure custom statements (e.g., banking statements), person-to-person customized e-mail, traceable e-mails, e-mails from customer service to existing customers, e-mails from an employer to an employee and the like. Network connection 34 may be wired or wireless and client 10 is, in some embodiments a portable computer or a tablet computer.

In some embodiments, for data security reasons, access to an entire customer database may be denied. In such embodiments, one or more files containing only the data required to generate the desired messages is made available to message personalization module 244 and/or mail transfer agent module 246.

In some embodiments, the mailing includes limited or full access rights to a users' data repository. For example, a mailing can include a command that defines limited or full login rights, limited or full query rights, access to only certain records, fields or files or certain portions of a database or data repository, access for a limited period of time, and the like.

In some embodiments, certain destinations associated with message personalization module 244 and/or mail transfer agent module 246 can be designed to be <EXML> enabled. For example, a particular mailbox called exml@strongmailsystems.com (or exml@mtacompany.com) can be set up so that, when a user sends a mailing to such an address, the request is parsed by message personalization module 244 and personalized messages are distributed by mail transfer agent module 246 based on the product of message personalization module 244 after parsing the EXML message.

In some embodiments, a target recipient relationship management module 70 of user computer 10 has the ability to personalize messages (e.g. personalized e-mails) based on database tokens. In such embodiments, user computer 10 can originate a template 72 that contains EXML formatting and data pointer information. In one example, for each digital message (e.g., e-mail) specified by template 72, the First_Name and Account_ID of each customer in a customer list can be represented, for example, as EXML tokens in the body of template 72. Template 72 containing these tokens is then sent to server 202, which then uses advanced parsing techniques to personalize the message (e.g., process as "Dear ##First_Name##, . . . ") for each target recipient 206. The personalized messages are then sent to each recipient 206 specified by the original mailing.

In another embodiment, client 10 creates a mailing consisting of a single message (e.g., e-mail). The message contains a template 72, the full list of recipients 206, and a token list 74 for formatting within the message itself. The receiving system 202 receives this single message mailing, then generates one or more outgoing personalized messages (e.g., e-mail, FAXes, IM, voice, etc.) based upon the data contained within the single message mailing itself.

A more detailed example of a template 72 used in a mailing in accordance with an embodiment of the present disclosure is reproduced below.

| Sample message template 72: | |
| --- | --- |
| 1 | X-MailingID: ##MailingID## |
| 2 | Subject: Hi ##email## |
| 3 | Content-type: text/html |
| 4 | |
| 5 | Dear ##name##: |
| 6 | |
| 7 | This is a sample message. Your offer is: |
| 8 | ##\id.Offer## |
| 9 | |
| 10 | Thank You |

The exemplary template 72 above contains both general text that will remain unaltered during the personalization process and tokens, denoted by ##[token]##. For example, line 5 consists of general text "Dear" and ":" and token "##name##". As will be discussed later in the present disclosure, during the personalization process, tokens such as ##name## are replaced by the corresponding value contained in a token list 74. Thus, a finished personalized message would essentially resemble the sample template above, except all tokens are replaced with respective token values. As discussed above, tokens can be either global or local. In the instant example, global tokens are not represented differently from local tokens 256. Thus, the status of a token in the instant example cannot be ascertained simply by reading the template. Rather, the status of a token is ascertained by resolving the token. For example, without a global or local token designation, the token "##name##" can be either global or local. In some embodiments, as in the instant example, global tokens 250 and local tokens 256 cannot be differentiated without resolving token values. In other embodiments, global tokens 250 and local tokens 256 are labeled differently in the template 72 itself. In still other embodiments, global tokens 250 and local tokens 256 are represented in the same format, as in the above example, but marked by some signal indicating whether the token is global or local.

In some embodiments, a template 72 can also contain recursive tokens. An example of a recursive token is a token that references a subtoken, e.g. a token referenced by another token. The subtoken itself can be another recursive token that references yet another subtoken. For instance the token "##\id.Offer##" on line 8 of the instant example represents a recursive token that implies the value of the subtoken "Offer" within the value of the "id" token. For example, if token "Offer" represents value "This is an offer for ##Name##," and token "id" represents value "John," then the recursive token "\id.Offer" represents the value "This is an offer for John." In some embodiments, recursive global tokens can only reference other global tokens and recursive local tokens can only reference other local tokens. In other embodiments, recursive global tokens can reference local tokens and recursive local tokens can reference global tokens.

In some embodiments, the header of a template 72 is specified in the beginning of the message. The header information can go into the header or text of the personalized messages or can be left out of the personalized messages completely (e.g. used only for processing purposes). In the instant example, the message header starts at line 1 of the template message and ends with blank line 4 following the phrase "Content-type: text/html" on line 3. It is important to note that the end of the message headers can be denoted in a variety of ways, such as a specific ASCII character or sequence of characters, or at a fixed number of bits or bytes from the beginning of the file storing the message.

The template 72 represented above represents only one example of a template in accordance with an embodiment of the present disclosure. Content, organization, and format of the template can vary and still be within the scope of the present disclosure.

A more detailed example of a token list 74 used in a mailing in accordance with an embodiment of the present disclosure is reproduced below.

---
Sample Token List 74:
---
MailingID=1235
1 {
    Offer {
        This is a car offer for ##Name## based on id: ##id##.
    }
}
2 {
    Offer {

---
Sample Token List 74:
---
        This is a motorbike offer for ##Name## based on id: ##id##.
    }
}
3 {
    Offer {
        This is a Toy offer for ##Name## based on id: ##id##.
    }
}

---

The exemplary token list 74 above contains tokens and corresponding token values. The token values can be numbers, text, or tokens themselves. For example, tokens—"MailingID," "1 Offer," "2 Offer," and "3 Offer"—correspond to token values—"1235," "This is a car offer for ##Name## based on id: ##id##.," "This is a motorbike offer for ##Name## based on id: ##id##.," and "This is a Toy offer for ##Name## based on id: ##id##."—respectively.

A more detailed example of a database 56 that can be utilized by a message personalization system in accordance with an embodiment of the present disclosure is reproduced below.

---
Sample Database 44:
---
a@a.com::2::A
t@t.com::1::T

---

As discussed above, a database or data repository 44 contains target recipient information in, for example, record-level form. In other words, each record in database 44 contains information about a target recipient. Each record contains values for local tokens in a pre-defined format. In the above example, each record 46 uses the format "email::id::Name," with "::" as delimiters, to represent values for the tokens "email," "id," and "Name." For example, the first record in the above sample database contains the value "a@a.com" for the token "email." Database or data repository records 46 can take any number of forms using a variety of formats in accordance with embodiments of the present disclosure.

Using the sample template 72, sample token list 74, and sample database 44 above, a more detailed example of an algorithm for message personalization that can be utilized by a message personalization system in accordance with an embodiment of the present disclosure is reproduced below.

---
Sample Algorithm:
---
step 1. Initial state:
    Global Cache : <empty>
    Local Cache: <empty>
step 2. Pre-process message template at the global level:

```
                            Sample Algorithm:

Global Cache: [MailingID]:[1235]
      Local Cache: <empty>
      Template takes following shape
step 3. Pick first record a@a.com::2::A and start personalization.
      Global Cache: [MailingID]:[1235], [2Offer]:[  This is a motorbike offer for
##Name## based on id: ##id##.],
      Local Cache: [email]:[a@a.com], [Name]:[A], [id]:[2], [2Offer]:[  This is a
motorbike offer for A based on id: 2.], [\id.Offer]:[  This is a motorbike offer for A
based on id: 2.]
(Message is fully personalized using local cache for repeated tokens in the message.)
step 4. Flush the Local cache.
      Global Cache: [MailingID]:[1235], [2Offer]:[  This is a motorbike offer for
##Name## based on id: ##id##.]
      Local Cache: <empty>
step 5. Pick the second record t@t.com::1::T and start personalization.
      Global Cache: [MailingID]:[1235], [2Offer]:[  This is a motorbike offer for
##Name## based on id: ##id##.], [1Offer]:[  This is a car offer for ##Name## based
on id: ##id##.]
      Local Cache: [email]:[t@t.com], [Name]:[T], [id]:[1], [1Offer]:[  This is a car
offer for T based on id: 1.], [\id.Offer]:[  This is a car offer for T based on id: 1.]
(Message is fully personalized using local cache for repeated tokens in the message.)
step 6. Flush the Local cache.
      Global Cache: [MailingID]:[1235], [2Offer]:[  This is a motorbike offer for
##Name## based on id: ##id##.], [1Offer]:[  This is a car offer for ##Name## based
on id: ##id##.]
      Local Cache: <empty>
```

The exemplary algorithm above utilizes two levels of cache, a global cache 248 and a local cache 254, in accordance with an embodiment of the present disclosure. The global cache stores tokens that can be resolved in the deepest form using the token list 74. The local cache stores tokens that can only be fully resolved using record level information from the database 44.

In step one of the exemplary algorithm, the initial state, both global and local caches are empty.

In step two of the exemplary algorithm, the template 72 is tokenized at the global level. This means that any global tokens identified in the template are stored in the global cache 248 along with the corresponding values listed in the token list. In the example above, the token "##MailingID##" is a global token. From the sample token list, "##MailingID##" has a token value of "1235." Thus, the global token "##MailingID##" and its corresponding value "1235" is stored in global cache 248 as "[MailingID]:[1235]." Token/value pairs can be stored in a variety of formats. The format shown above in step two of the sample algorithm represents just one example of a stored entry in global cache 248. After step two of the sample algorithm, the tokenized template 72 looks like the following:

```
      X-MailingID: 1235
      Subject: Hi ##email##
      Content-type: text/html
      Dear ##name##:
      This is a sample message. Your offer is:
      ##\id.Offer##
      Thank You
```

In step 3 of the algorithm, a record a@a.com::2:: is chosen for personalization. Local tokens "email," "Name," "id," "2Offer," and "\id.Offer" and corresponding values are added to local cache 254. In the above example, the tokens "2Offer" and "\id.Offer" have the same corresponding value. In some embodiments, two tokens can have the same value. It is important to note that the token "2Offer" is also added to global cache 248. Although "2Offer" is a global token (the value was resolved using the token list and is not necessarily specific to a particular record), it is also a local token because it could not have been resolved without reference to a record. "2Offer" could not have been resolved in step 2 because "2Offer" is a global subtoken of recursive token "\id.Offer," which is dependent upon local token "id." It is worth noting that "2Offer" has a corresponding value that is non-target specific in global cache 248 and a corresponding value that is target specific in local cache 254.

In the present example, global cache entries can be added in step 2 and in step 3. In alternative embodiments, global cache entries can be added any in any step or can be limited to be added only in certain steps. It is worth noting that the order or time of entry is not important.

After step three, the message is fully personalized with respect to record a@a.com::2::A. The personalized message is then sent to a@a.com or saved into memory for sending later. The fully personalized message after step 3 is presented below.

```
      X-MailingID: 1235
      Subject: Hi a@a.com
      Content-type: text/html
      Dear A:
      This is a sample message. Your offer is:
          This is a motorbike offer for A based on id: 2.
      Thank You
```

In step four, the local cache 254 is flushed.

In step five, a second record t@t.com::1::T is chosen and the personalization process is repeated with respect to the second record. Note that the global cache 248 is not flushed and additional global tokens, e.g. "1Offer," are added in addition to tokens added from previous steps.

In step six, the local cache 254 is once again flushed. Since the sample database 44 only contains two records, the process ends after step 6. Otherwise, another record is chosen and the personalization process is repeated for any additional record remaining. As a secondary example, the personalized message for record t@t.com:: 1::T is reproduced below.

```
X-MailingID: 1235
Subject: Hi t@t.com
Content-type: text/html
Dear T:
This is a sample message. Your offer is:
    This is a car offer for T based on id: 1.
Thank You
```

The example above represents an example of a finished personalized message product in accordance with embodiments of the present disclosure. The exemplary personalized message no longer contains any tokens. All global and local tokens have been replaced with token values and hence the message is personalized and complete.

As mentioned above, the message personalization process can be optimized using two levels of cache, e.g. a global cache 248 and a local cache 254. One advantage of having two levels of cache is more efficient use of smaller cache sizes. Because each target recipient has personalization information that only pertains to that particular recipient, e.g. a name or email address, the personalization information is no longer useful once a message has been personalized for that target recipient. Therefore, an exemplary local cache 254 stores the personalization information for a particular target recipient until the message personalization process is completed and then flushes its contents to free up memory space for personalization information of the next target recipient. Without a second, e.g. local, level of cache, either much more memory space would be needed to continually store added personalization information or no cache is used, in which case the processing would be much slower as discussed further below. Another advantage of using two levels of cache is faster processing speed. Without two levels of cache the personalization process would have to be completed with only one cache or no cache at all. With no cache, each token encountered triggers a new look-up of the token value, even if the same token as already been encountered. This leads to repetitive, wasteful, and inefficient processing. With only one cache, as discussed above, the memory space needed would need to be much larger. This would lead to slower reads and writes to the cache and would ultimately reduce processing speed significantly.

The present disclosure places no restrictions on the order that each of the aforementioned steps appear within the algorithm. However, generally speaking, the steps of the algorithm occur in sequence from steps one through six. In other embodiments, other intermediary steps occur at the beginning, middle, or end of the algorithm. There is no requirement that any of the tokens appear in a token list. For example, in some embodiments, the token list can be a null set. There is no requirement for the location of target recipient data repository. For example, in some embodiments, target recipient data repository 44 consists of external files and databases. Such external files or databases can, for example, be at one or more locations that are addressable by message personalization module 244 via network/Internet 34. For instance, in some embodiments, a mailing can refer message personalization module 244 to a specific URL address in order to obtain all or a portion of the data belonging to any of the aforementioned information elements.

There is no requirement that the mailing have more than one final recipient. In fact, in some instances there is only one final recipient. For example, in the exemplary mailing above, rather than having steps four through six, the algorithm stops after step three. In some other embodiments, the mailing necessitates more than one final recipient. In those cases, the algorithm would proceed as disclosed in the example above.

In some embodiments in accordance with the present disclosure, a user may utilize embedded tokens in a template 72 to obtain customized data from different resources. In some embodiments, a menu choice, such as those observed for a typical My Yahoo interface, is provided so that the user may choose to include relevant information by selecting to turn on one or more of the token features, which are then incorporated into the template. In other words, in some embodiments of the present disclosure, a graphical user interface that includes menu choices may be employed by a user in order to construct a mailing.

In some embodiments in accordance with the present disclosure, the mailing may be sent from one computer to one or more other computers. For example, client 10 may be a part of the built-in computer system associated with a refrigeration unit that sends out mailings in response to certain events, e.g., the quantity of milk supply in the refrigerator. When the milk supply drops below a predetermined level, client 10 originates and sends out a mailing. The mailing is sent to, for example, exml@xyz.com, the address of module 244. Module 244 processes the mailing and sends personalized messages to the target recipients 206. Module 244 is hosted by server 202. In some embodiments, server 202 hosts a website of a grocery store and has access to one or more grocery databases. Module 244 processes the mailing and extracts relevant information out of the grocery databases to generate a personalized message to be posted on the web site or a separate grocery store database (e.g., recipient 206). Product delivery may be arranged accordingly. Alternatively, module 244 processes the mailing and extracts the relevant information out of the grocery database to generate a personalized message that gets sent back to client 10 to compile a grocery list. The personalized message contains, for example, price and product information for milk products that are available at the grocery store. In some embodiments, the personalized message also contains additional produce or food or non-food product information that is relevant to the product inquiry (e.g., information on cheese or yogurt products may accompany a milk shortage warning message).

In some embodiments in accordance with the present disclosure, mailings may be sent from a person for use by a recipient that is a computer itself, as opposed to a person that has access to the computer. Correspondingly, in some embodiments, the originator of a mailing in some embodiments of the present disclosure is a computer, as in the refrigerator example above, not a person, and, in such embodiments, the intended recipient is one or people or one or more computers. To illustrate one such embodiment, a blog owner may program a client 10 so that it automatically sends out mailings of the present disclosure to the computer system that hosts the blog (e.g., recipient 206). The mailing may contain tokens that correspond to, for example, the account ID of the blog owner and topic and general interest information of the blog. In some embodiments, the mailing is processed by module 244 of recipient system 206 to generate personalized messages that will be posted accordingly on the blog site. Alternatively, mailings may be sent from the computer system that maintains the blog site to one or more blog owners. Such mailings contain tokens that correspond to, for example, the account ID of the blog owner and topic and general interest information of the blog. Appropriate information may be retrieved from the Internet and composed into personalized messages to each blog user.

In some embodiments in accordance with the present disclosure, additional modules may be added to the message personalization module (e.g., component 244) such that the personalized messages may be converted to voice mails. Exemplary text-voice conversion tools include the voice extensible markup language (VoiceXML). VoiceXML is designed for creating audio dialogs that feature synthesized speech, digitized audio, recognition of spoken and dual-tone-multi-frequency (DTMF) key input, recording of spoken input, telephony, and mixed initiative conversations. A goal of VoiceXML is to bring the advantages of web-based development and content delivery to interactive voice response applications.

The exemplary mailing provided above illustrates the advantages of the present disclosure. The language used in the exemplary mailing is used to define a data structure that is delivered to batch e-mail personalization server 202. The mailings contain all the data necessary to obtain personalized messages including both the templates and the token lists. Once constructed, the need to have an IT specialist involved in future communication is obviated. A business development professional simply alters the templates or token lists for new mailings.

The present invention can be implemented as a computer program product that comprises a computer program mechanism embedded in a computer readable storage medium. For instance, the computer program product could contain the program modules shown in FIG. 3 and/or FIG. 4. These program modules can be stored on a CD-ROM, DVD, magnetic disk storage product, or any other computer readable data or program storage product. The program modules can also be embedded in permanent storage, such as ROM, one or more programmable chip, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A computer-implemented method for building a plurality of personalized messages from a mailing without human intervention, wherein the mailing uses one or more templates and one or more token lists, and wherein each template in the one or more templates comprises a subset of global tokens in a plurality of global tokens, and each template in the one or more template comprises a subset of local tokens in a plurality of local tokens, the method being performed by one more processors and one or more memory, the one or more memory storing a global cache and a local cache wherein, for each respective target recipient in a plurality of target recipients, the method comprises:

(a) identifying, in a template designated for the respective target recipient in the one or more templates, one or more global tokens not found in the global cache;

(b) obtaining, for each global token in the one or more global tokens identified in (a), a corresponding global token value from the one or more token lists, each token list in the one or more token lists including one or more global tokens in the plurality of global tokens and corresponding global token values;

(c) storing in the global cache, the one or more global tokens identified in (a) and their corresponding global token values obtained in (b);

(d) storing in the local cache one or more local tokens in the template designated for the target recipient and corresponding local token values when the one or more local tokens are not present in the local cache; and (e) building a personalized message from the template designated for the respective target recipient by substituting global tokens in the template designated for the respective recipient with global token values stored in the global cache and substituting local tokens in the template designated for the respective recipient with local token values associated with the respective target recipient that are stored in the local cache, thereby building the plurality of personalized messages, wherein each personalized message in the plurality of personalized messages corresponds to a target recipient in a plurality of target recipients.

2. The computer-implemented method of claim 1, further comprising flushing the local cache after building a first personalized message in the plurality of personalized messages and before building a second personalized message in the plurality of personalized messages.

3. The computer-implemented method of claim 1, wherein the method occurs during load time.

4. The computer-implemented method of claim 1, further comprising sending each respective personalized message in the plurality of personalized messages to the corresponding target recipient.

5. The computer-implemented method of claim 1, wherein the steps of the method are performed on a server.

6. The computer-implemented method of claim 1, wherein the local token values stored in (d) are retrieved from a data repository of target recipient records and information.

7. The computer-implemented method of claim 1, wherein the local token values stored in (d) are retrieved from a local token list received from a client computer.

8. The computer-implemented method of claim 1, wherein the one or more templates are received from a client computer.

9. The computer-implemented method of claim 1, wherein the one or more token lists in (b) are received from a client computer.

10. The computer-implemented method of claim 1, wherein global token values or local token values are themselves tokens or subtokens.

11. The computer-implemented method of claim 1, wherein the personalized messages can be e-mail, SMS, FAX, IM, social network posts, voice, or any other digital communication process.

12. A computing device for building a plurality of personalized messages from a mailing without human intervention, wherein the mailing uses one or more templates and one or more token lists, and wherein each template in the one or more templates comprises a subset of global tokens in a plurality of global tokens, and each template in the one or more templates comprises a subset of local tokens in a plurality of local tokens, the computing device comprising a processor and a memory, the memory storing a global cache and a local cache, wherein, for each respective target recipient in the plurality of target recipients, the memory comprises instructions, executable by the processor, for:
(a) identifying, in a template designated for the respective target recipient in the one or more templates, one or more global tokens not found in the global cache;
(b) obtaining, for each global token in the one or more global tokens identified in (a), a corresponding global token value from the one or more token lists, each token list in the one or more token lists including one or more global tokens in the plurality of global tokens and corresponding global token values;
(c) storing in the global cache, the one or more global tokens identified in (a) and their corresponding global token values obtained in (b);
(d) storing in the local cache one or more local tokens in the template designated for the respective target recipient and corresponding local token values when the one or more local tokens are not present in the local cache; and
(e) building a personalized message from the template designated for the respective target recipient by substituting global tokens in the template designated for the respective recipient with global token values stored in the global cache and substituting local tokens in the template designated for the respective recipient with local token values associated with the respective target recipient that are stored in the local cache,
thereby building the plurality of personalized messages, wherein each personalized message in the plurality of personalized messages corresponds to a target recipient in a plurality of target recipients.

13. The computing device of claim 12, wherein the memory further comprises instructions for flushing the local cache after building a first personalized message in the plurality of personalized messages and before building a second personalized message in the plurality of personalized messages.

14. The computing device of claim 12, wherein the instructions are executed during load time.

15. The computing device of claim 12, wherein the memory further comprises instructions for sending each respective personalized message in the plurality of personalized messages to the corresponding target recipient.

16. The computing device of claim 12, wherein the local token values stored in the local cache by the storing (d) are retrieved from a data repository of target recipient records and information.

17. The computing device of claim 12, wherein the local token values stored in the local cache by the storing (d) are retrieved from a local token list received from a client computer.

18. The computing device of claim 12, wherein the one or more templates are received from a client computer.

19. The computing device of claim 12, wherein the one or more token lists in (b) are received from a client computer.

20. A computer system for building a plurality of personalized messages from a mailing without human intervention, wherein the mailing uses one or more templates and one or more token lists, and wherein
each template in the one or more templates comprises a subset of global tokens in a plurality of global tokens, and
each template in the one or more templates comprises a subset of local tokens in a plurality of local tokens,
the computer system comprising one or more processors and one or more memory, wherein, the one or more memory storing a global cache and a local cache, wherein, for each respective target recipient in the plurality of target recipients, the one or more memory comprise instructions, executable by the one or more processors, for:
(a) identifying, in a template designated for the respective target recipient, one or more global tokens not found in the global cache;
(b) obtaining, for each global token in the one or more global tokens identified in (a), a corresponding global token value from the one or more token lists, each token list in the one or more token lists including one or more global tokens in the plurality of global tokens and corresponding global token values;
(c) storing in the global cache, the one or more global tokens identified in (a) and their corresponding global token values obtained in (b);
(d) storing in the local cache one or more local tokens in the one or more templates and corresponding local token values when the one or more local tokens are not present in the local cache; and
(e) building a personalized message from the template designated for the respective target recipient by substituting global tokens in the template designated for the respective target recipient with global token values stored in the global cache and substituting local tokens in the template designated for the respective target recipient with local token values associated with the respective target recipient that are stored in the local cache,
thereby building the plurality of personalized messages, wherein each personalized message in the plurality of personalized messages corresponds to a target recipient in the plurality of target recipients.

21. A non-transitory computer readable medium comprising instructions to perform a method for building a plurality of personalized messages from a mailing without human intervention, wherein the mailing uses one or more templates and one or more token lists, and wherein
each template in the one or more templates comprises a subset of global tokens in a plurality of global tokens, and
each template in the one or more templates comprises a subset of local tokens in a plurality of local tokens,
the method being performed by one more processors and one or more memory, the one or more memory storing a global cache and a local cache wherein, for each respective target recipient in the plurality of target recipients, the method comprises:
(a) identifying, in a template designated for the respective target recipient in the one or more templates, one or more global tokens not found in a global cache;
(b) obtaining, for each global token in the one or more global tokens identified in (a), a corresponding global token value from the one or more token lists, each token list in the one or more token lists including one or more global tokens in the plurality of global tokens and corresponding global token values;
(c) storing in the global cache, the one or more global tokens identified in (a) and their corresponding global token values obtained in (b);
(d) storing in the local cache one or more local tokens in the template designated for the target recipient and corresponding local token values when the one or more local tokens are not present in the local cache; and
(e) building a personalized message from the one or more templates for the respective target recipient by substituting global tokens in the template designated for the target recipient with global token values stored in the global cache and substituting local tokens in the template designated for the target recipient with local token values associated with the respective target recipient that are stored in the local cache, thereby building the plurality of personalized messages, wherein each personalized message in the plurality of personalized messages corresponds to a target recipient in the plurality of target recipients.

* * * * *